United States Patent
Hermsen

(10) Patent No.: US 7,267,399 B2
(45) Date of Patent: Sep. 11, 2007

(54) MOTION ASSEMBLY AND OPEN ROOF ASSEMBLY PROVIDED THEREWITH

(75) Inventor: Erwin Jacobus Christian Leonardus Hermsen, Horst aan de Maas (NL)

(73) Assignee: Inalfa Roof Systems Group B.V., Venray (NL)

( * ) Notice: Subject to any disclaimer, the term of this patent is extended or adjusted under 35 U.S.C. 154(b) by 87 days.

(21) Appl. No.: 11/348,288

(22) Filed: Feb. 6, 2006

(65) Prior Publication Data

US 2006/0186710 A1 Aug. 24, 2006

(30) Foreign Application Priority Data

Feb. 7, 2005 (EP) .................................. 05100830

(51) Int. Cl.
*B60J 7/047* (2006.01)

(52) U.S. Cl. .................................. 296/220.01; 160/201
(58) Field of Classification Search ........... 296/220.01; 160/201
See application file for complete search history.

(56) References Cited

U.S. PATENT DOCUMENTS

| 1,839,727 A | 1/1932 | Austin |
| 5,421,635 A | 6/1995 | Reinsch et al. |

FOREIGN PATENT DOCUMENTS

| DE | 4404618 | 3/1995 |
| DE | 10106432 | 2/2001 |
| EP | 00591644 | 4/1994 |
| FR | 1512575 | 12/1966 |
| WO | WO 03/076220 | 9/2003 |

OTHER PUBLICATIONS

Submitted herewith is a copy of a European Search Report of the European Patent Office in counterpart foreign application No. EPO 05100830 filed Feb. 7, 2005.

*Primary Examiner*—Dennis H. Pedder
(74) *Attorney, Agent, or Firm*—Steven M. Koehler; Westman, Champlin & Kelly, P.A.

(57) ABSTRACT

A motion assembly is provided for moving a number of panels between a coplanar position in which the panels are positioned adjacent each other and extend in the same plane, and a stacked position in which the panels are positioned one on top of the other. Each panel at each of its longitudinal sides is provided with a forward guide pin and a rearward guide pin which are guidingly housed in guides extending in parallel to said longitudinal sides. The guide for the forward guide pin ends in a first inclined guide section enclosing an angle with the remainder of said guide. The guide for the rearward guide pin ends in a second correspondingly inclined guide section enclosing an angle with the remainder of said guide. The distance between the first inclined guide section and the second inclined guide section substantially corresponds with the distance between the forward and rearward guide pins. Connecting devices are provided for connecting each panel with an adjacent panel. The first inclined guide section comprises alternating inclined parts and parts extending in parallel to the guide, wherein the spacing between two successive parallel parts substantially corresponds with the spacing of the panels in the stacking direction.

8 Claims, 3 Drawing Sheets

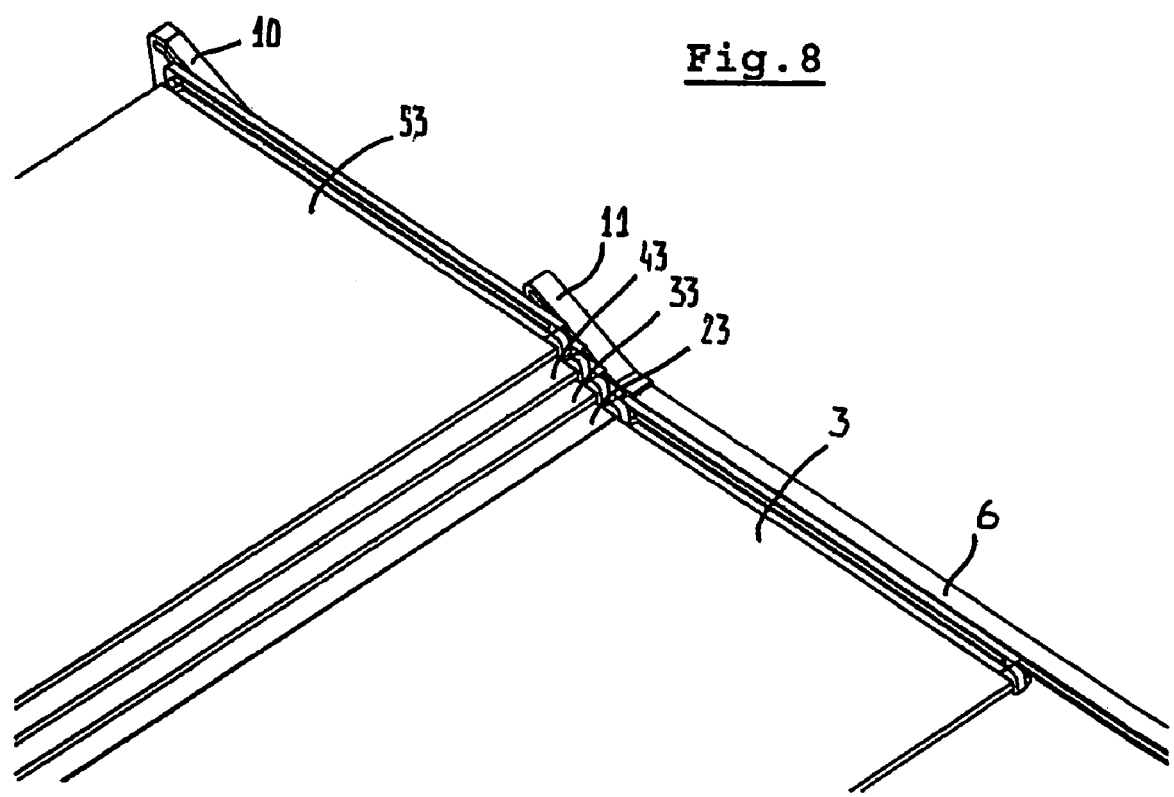

MOTION ASSEMBLY AND OPEN ROOF ASSEMBLY PROVIDED THEREWITH

BACKGROUND OF THE INVENTION

The discussion below is merely provided for general background information and is not intended to be used as an aid in determining the scope of the claimed subject matter A motion assembly for closing and exposing a roof opening, such as is in a vehicle roof by moving a number of panels between a coplanar position in which the panels are positioned adjacent each other and extend in the same plane, and a stacked position in which the panels are positioned one on top of the other are known. In such motion assemblies, each panel at each of its longitudinal sides is provided with a forward guide pin and a rearward guide pin which are guidingly housed in guides extending in parallel to said longitudinal sides. The guide for the forward guide pin ends in a first inclined guide section enclosing an angle with the remainder of said guide, while the guide for the rearward guide pin ends in a second correspondingly inclined guide section enclosing an angle with the remainder of said guide. The distance between the first inclined guide section and the second inclined guide section substantially corresponds with the distance between the forward and rearward guide pins, while connecting devices are provided for connecting each panel with an adjacent panel.

Examples of such a motion assembly, as provided for closing and exposing a roof opening in a vehicle roof, are, among others, described in U.S. Pat. No. 1,839,727, DE-A-1.010.6432 and EP-A-591.644.

SUMMARY OF INVENTION

This Summary and Abstract are provided to introduce some concepts in a simplified form that are further described below in the Detailed Description. This Summary and Abstract are not intended to identify key features or essential features of the claimed subject matter, nor are they intended to be used as an aid in determining the scope of the claimed subject matter. In addition, the description herein provided and the claimed subject matter should not be interpreted as being directed to addressing any of the short-comings discussed in the Background.

A motion assembly includes a first inclined guide section comprising alternating inclined parts and parts extending in parallel to the guide, wherein the spacing between two successive parallel parts substantially corresponds with the spacing of the panels in the stacking direction.

When the panels are moved from the coplanar position towards the stacked position, the individual panels will successively cooperate with the first and second inclined guide sections. The forward guide pin of each panel will move along the first inclined guide section, whereas the rearward guide pin will move along the second inclined guide section. As a result, this panel will be displaced out of the common plane of the panels in the coplanar position, such that a following panel can be moved underneath it. Each following panel will be displaced in a corresponding manner and this process will be repeated until all panels have assumed a stacked position, in which the panels are positioned one on top of the other.

The alternating arrangement of inclined parts and parts extending in parallel to the guide contributes to a stable positioning of the panels (especially the transversal edges thereof near to the forward guide pins) in the stacked position. In one embodiment, only when a next panel is added to the stack, the forward guide pins of the panels are located in the inclined parts of the first inclined guide section; at any other moment said forward guide pins are located in the parts extending in parallel to the guide.

Connecting devices maintain the coherence between adjacent panels, not only during the stacking operation, but also during the opposite operation, in which the panels are moved from the stacked position towards the coplanar position. It is noted, that a displacement of a panel out of the common plane of the panels may occur in two directions. In a situation, in which the coplanar panels extend substantially horizontally, such a displacement may occur upwards or downwards.

Further it is noted, that the expressions "forward" and "rearward" relate to the direction of movement of the panels from the coplanar position towards the stacked position.

The distance between the guide sections can differ slightly from the distance between the guide pins. As a result it can be avoided that the forward and rearward (transversal) edges of a panel will be lifted simultaneously, which would lead to adverse large loads on the structure of the motion assembly.

Basically, it is conceivable that both the forward guide pin and rearward guide pin cooperate with separate guides, such that it is very easy to determine the correct motion of such forward and rearward guide pins. However, it has the adverse effect that the motion assembly will become unnecessarily bulky.

Thus, in accordance with an embodiment of the motion assembly, the forward and rearward guide pins cooperate with one and the same guide, wherein the second inclined guide section is defined by a guide section branching off from the remainder of the guide, whereas provisions are made for letting the forward guide pin pass beyond said branching off second inclined guide section when the panels move from the coplanar position towards the stacked position, but diverting the rearward guide pin into said branching off second inclined guide section.

As a result, only one guide has to be presented for both the forward guide pin and rearward guide pin. Then, however, special provisions should be made for ensuring, that each guide pin will cooperate with its assigned guide section.

In accordance with yet another embodiment, the guide may comprise a diversion element for cooperation with the rearward guide pin, wherein the rearward guide pin extends into said guide deeply enough so as to cooperate with said diversion element, whereas the forward guide pin extends less deeply into the guide such as to pass beyond said diversion element without engaging it. As a result of such an arrangement it is ensured that the forward guide pin will not cooperate with the second inclined guide section, and that only the rearward guide pin will cooperate therewith.

An example of such a diversion element is defined by an inclined wall section protruding into the guide and leading towards the second inclined guide section.

As stated before, connecting devices will be provided for connecting each panel with an adjacent panel. In an embodiment, such connecting devices may comprise a connecting pin on one panel movably engaging in a curve of an adjacent panel. On one hand, the combination of connecting pin and curve realises a mechanical connection between adjacent panels, but on the other hand such a combination also will allow a defined relative movement between both panels. Such a relative movement will be necessary when the panels are moved from the coplanar position towards the stacked position.

As an example, an embodiment of the motion assembly is mentioned, in which the connecting pin is located near to the rearward guide pin, whereas the curve extends substantially in parallel to said longitudinal side and, near to the forward guide pin, ends in an inclined curve section, the arrangement being such that in the coplanar position of the panels the connecting pin is located in the inclined curve section, whereas during the stacking operation the connecting pin moves towards and into the parallel section of the curve.

Initially, in the coplanar position of the panels, the connecting pin is located in the inclined curve section. When the forward guide pin and rearward guide pin of the panel engage the assigned inclined guide sections, the connecting pin will move along the inclined curve section towards the parallel section of the curve, which it will reach at the moment that the panel has been displaced from the common plane of the panels sufficiently to allow the adjacent, following panel to pass therebelow. When such an adjacent, following panel (which includes the curve cooperating with the connecting pin) passes below said panel, the connecting pin will move along the parallel section of the curve.

In the reverse order, when moving the panels from the stacked position towards the coplanar position, firstly the lowermost panel is moved relative to the remaining panels in the stack, and the connecting pin of the panel on top of the lowermost panel will move along the parallel curve section towards the inclined curve section. After reaching the inclined curve section, the connecting pin will move along the inclined curve section, during which process the panel carrying the connecting pin will be lowered in the inclined guide sections and will assume a position coplanarly with the panel comprising the curve. Such a process will be repeated for all successive panels in the stack until all panels extend in a coplanar fashion.

Secondly, another aspect of the invention relates to an open roof assembly for a vehicle and a closure assembly for opening and closing said roof opening, wherein said closure assembly comprises a number of panels, and the roof assembly is further provided with a motion assembly for said panels in accordance with one or more aspects described herein.

BRIEF DESCRIPTION OF THE DRAWINGS

Next, the invention will be elucidated while referring to the drawing. Herein:

FIG. 8 shows, perspectively, part of a motion assembly.

DETAILED DESCRIPTION OF THE ILLUSTRATIVE EMBODIMENTS

Figure 1:
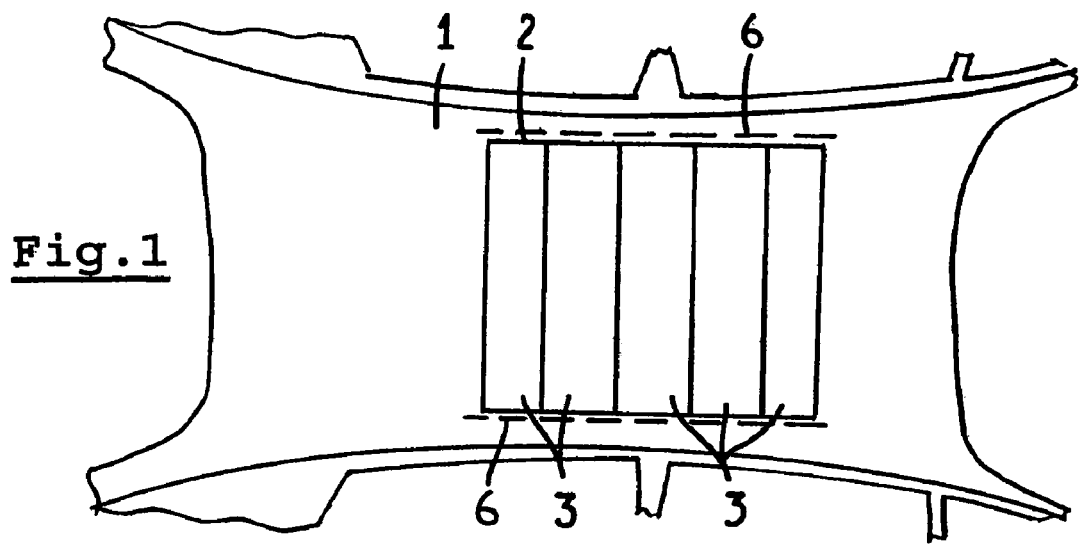
FIG. 1 shows, schematically, a partial top plan view of a vehicle comprising an open roof assembly.

FIG. 1 shows partially in a top plan view a stationary roof section 1 of a vehicle in which a roof opening 2 is defined. A closure assembly for opening and closing said roof opening 2 comprises a number of panels 3.

Figure 2:
FIG. 2 shows, schematically and in a side elevational view, the process of stacking panels.

By means of a motion assembly to be described hereinafter, the panels 3 are movable between a coplanar position in which they are positioned adjacent each other and extends generally in the same plane, and a stacked position in which the panels 3 are positioned one on top of the other. FIG. 2 illustrates both positions. The stack of panels 3 illustrated in full lines indicates the stacked position of the panels, whereas the panels 3' illustrated in dotted lines, together with the lowermost panel 3 of the stack of panels, define the coplanar position. In the coplanar position the panels will close the roof opening 2, whereas in the stacked position the roof opening 2 will be open.

Figure 3:
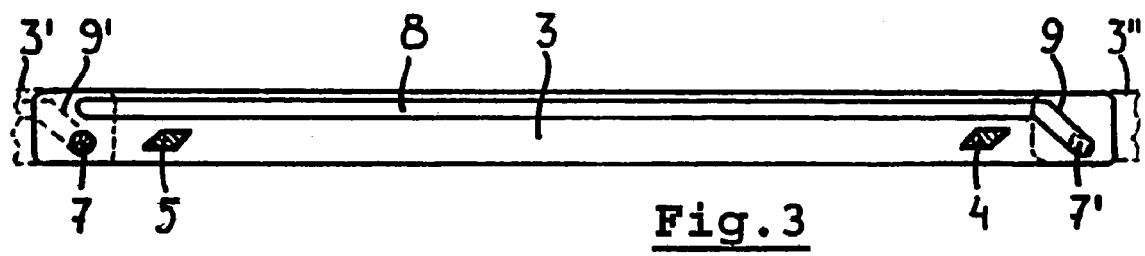
FIG. 3 shows on an enlarged scale, again schematically and in a side elevational view, a panel.

In FIG. 3 one longitudinal side of a panel 3 is shown schematically and in an elevational view. It is noted, that the opposite longitudinal side of the panel 3 will have the same design (although mirror-shaped). This longitudinal side is provided with a forward guide pin 4 and a rearward guide pin 5 extending transversally from the longitudinal side. These guide pins 4 and 5 each are guidingly housed in a guide 6 (FIG. 1) extending substantially in parallel to said longitudinal sides along the roof opening 2.

Further each longitudinal side of a panel 3 is provided with a connecting pin 7 which, in the illustrated embodiment, is located near to the rearward guide pin 5. Finally, each longitudinal side of the panel 3 is provided with a curve 8 extending substantially in parallel two said longitudinal side. Near to the forward guide pin 4 said curve 8 ends in an inclined curve section 9.

In the coplanar position of the panels 3, the connecting pin 7 engages the inclined curve section 9' of an adjacent panel 3' (as indicated in the left part of FIG. 3). In a corresponding manner the inclined curve section 9 of the panel 3 will be engaged by a connecting pin 7' of a next panel 3'' (see right part of FIG. 3).

In the coplanar position of the panels 3, the forward guide pin 4 and rearward guide pin 5 of all successive panels 3 are positioned in the guide 6 for a linear movement, when at least one of said panels 3 is driven by a driving device not shown in detail (but known per se and can include for example, hand cranks, motors, etc.), such as for example a cable drive. The driving connection between adjacent panels 3 is established by the cooperation between the connecting pins 7 and inclined curve sections 9.

Figure 4:
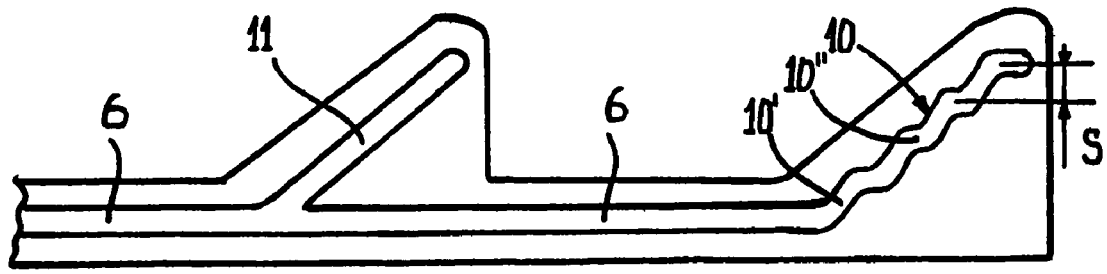
FIG. 4 shows part of a guide on a larger scale.

Now reference is made to FIG. 4, which illustrated part of the guide 6, especially said part which is operative when stacking panels into a stacked position. The guide 6 ends in a first inclined guide section 10 (which will be discussed in detail later). Further the guide 6 comprises a second inclined guide section 11 which, in the illustrated embodiment, branches off from the remainder of the guide 6. The first inclined guide section 10 is meant for receiving the forward guide pins 4 of successive panels 3, whereas the second inclined guide section 11 is meant for receiving the rearward guide pins 5 of successive panels 3.

Initially, a panel 3 will be positioned with its forward guide pin 4 and rearward guide pin 5 in the section of the guide 6 left (as seen in FIG. 4) from the second inclined guide section 11. When moving to the right (for opening the roof opening 2 while stacking the panels 3 into the stacked position) the forward guide pin 4 will pass the second inclined guide section 11 without entering it, and will finally reach the first inclined guide section 10. The rearward guide pin 5, however, will be forced into the second inclined guide section 11, whereas the forward guide pin 4 enters the first inclined guide section 10. As a result, the panel 3 will be moved upwards into both inclined guide sections 10 and 11, respectively, with its forward and rearward guide pins 4 and 5, respectively, under influence of a driving force transmitted by the inclined curve section 9 of a successive panel 3 to its connecting pin 7. At the same time, said connecting pin 7 will move upwards into said inclined curve section 9 towards the straight part of the curve 8.

A distance between the guide sections 10 and 11 can differ slightly from the distance between the guide pins 4 and 5, such that firstly only one of said guide pins will enter its respective guide section, shortly thereafter followed by the other guide pin entering its respective guide section. This will limit the loads on the structure.

As illustrated clearly in FIG. 4, the first inclined guide section 10 comprises alternating inclined parts 10' and parts 10" extending in parallel to the guide. The spacing s between two successive parallel parts 10" substantially corresponds with the spacing of the panels 3 in the stacking direction (i.e. the distance a panel 3 will be lifted for enabling a successive panel 3 to pass therebeneath). Positioned in the parallel parts 10", the forward guide pins 4 provide the panels 3 with a stable position.

Figure 5:
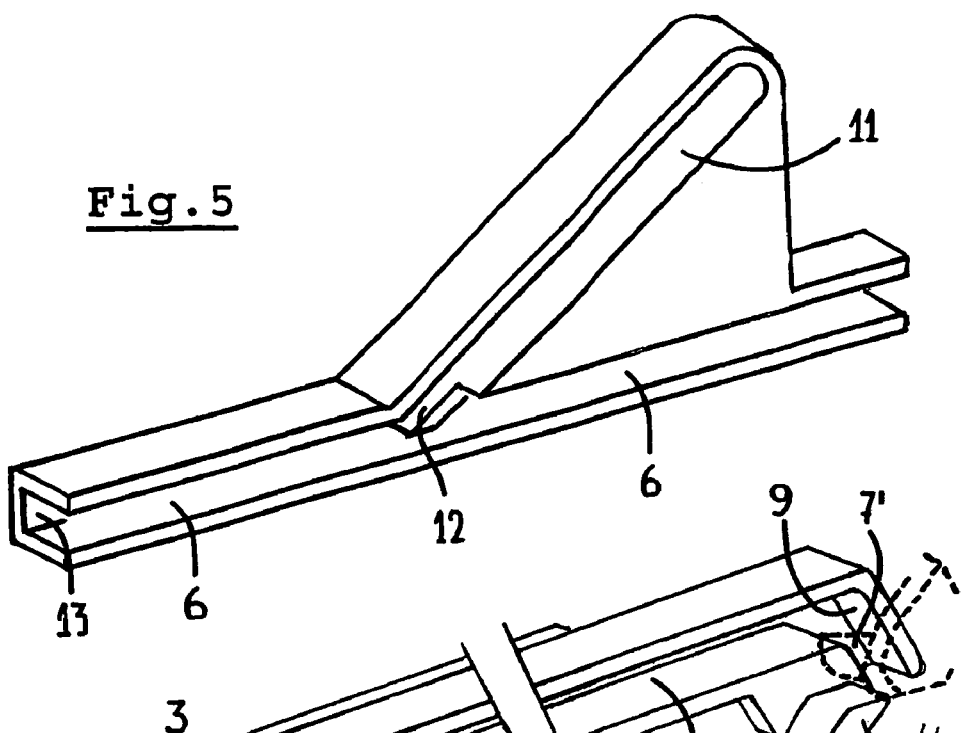
FIG. 5 shows, perspectively, part of a guide.

FIG. 5 shows a detail of the second inclined guide section 11. An inclined diversion element or wall section 12 protrudes from the back wall 13 of the guide 6 into said guide 6 and leads towards the second inclined guide section 11.

Figure 6:
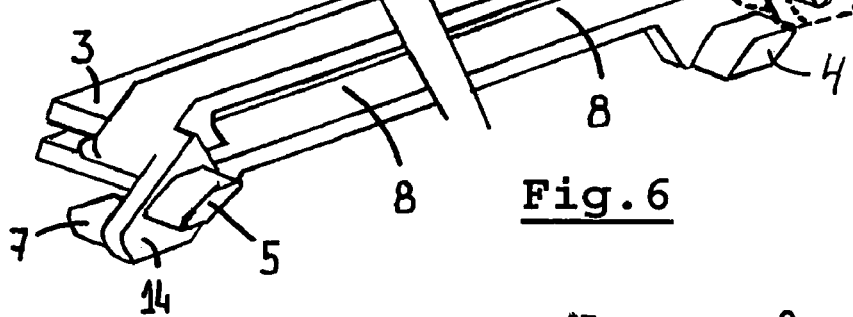
FIG. 6 shows, perspectively, part of a panel.

FIG. 6 shows a specific embodiment of a longitudinal side of a panel. Visible are the forward guide pin 4, rearward guide pin 5, connecting pin 7 and curve 8. In dotted lines a connecting pin 7' of an adjacent panel is illustrated, which connecting pin 7' engages the inclined curve section 9.

The rearward guide pin 5 is positioned on a base member 14, such that it projects further from said longitudinal side of the panel 3 then does the forward guide pin 4. As a result, the forward guide pin 4 can pass the inclined wall section 12 illustrated in FIG. 5 without entering the second inclined guide section 11, whereas the rearward guide pin 5 will be forced into said second inclined guide section 11 by the inclined wall section 12. Like this all forward guide pins 4 of successive panels 3 will be moved towards the first inclined guide section 10, whereas all rearward guide pins 5 will be moved into the second inclined guide section 11.

Figure 7:
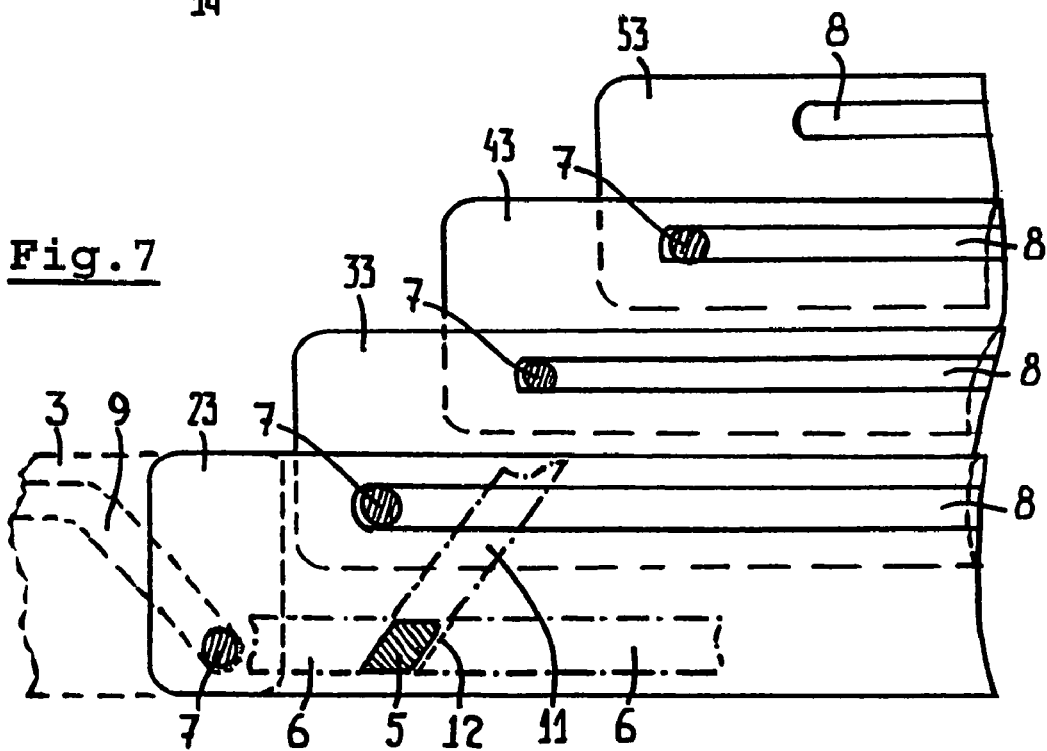
FIG. 7 shows, still further enlarged and partially, a number of stacked panels.

In FIG. 7 four stacked panels 23, 33, 43 and 53 are illustrated partially. The connecting pins 7 of the panels 33, 43 and 53 engage the horizontal part of the curves 8 of the panels 23, 33, 43, respectively. The connecting pin 7 of the lowermost panel 23 engages the inclined curve section 9 of an adjacent, following panel 3 (indicated in dotted lines). The lowermost panel 3 is at the beginning of its lifting process, because its rearward guide pin 5 has reached the inclined wall section or diversion element 12 of the second inclined guide section 11 of the guide 6.

Finally, FIG. 8 shows, perspectively, a situation, which corresponds with the situation illustrated in FIG. 7.

Although in the illustrated embodiment successive panels are stacked by lifting each panel and moving a following panel underneath, it also would be possible to stack the panels by lowering a panel and moving a successive panel thereover.

Although the subject matter has been described in language directed to specific environments, structural features and/or methodological acts, it is to be understood that the subject matter defined in the appended claims is not limited to the environments, specific features or acts described above as has been held by the courts. Rather, the environments, specific features and acts described above are disclosed as example forms of implementing the claims.

The invention claimed is:

1. A motion assembly for moving a number of panels between a coplanar position in which the panels are positioned adjacent each other and extend in the same plane, and a stacked position in which the panels are positioned one on top of the other, wherein:

each panel at each of its longitudinal sides is provided with a forward guide pin and a rearward guide pin which are guidingly housed in guides extending in parallel to said longitudinal sides;

the guide for the forward guide pin ends in a first inclined guide section enclosing an angle with the remainder of said guide;

the guide for the rearward guide pin ends in a second correspondingly inclined guide section enclosing an angle with the remainder of said guide;

the distance between the first inclined guide section and the second inclined guide section substantially corresponds with the distance between the forward and rearward guide pins;

the first inclined guide section comprises alternating inclined parts and parts extending in parallel to the guide, wherein the spacing between two successive parallel parts substantially corresponds with the spacing of the panels in the stacking direction; and connecting devices are configured for connecting each panel with an adjacent panel.

2. The motion assembly according to claim 1, wherein the distance between the guide sections differs slightly from the distance between the guide pins.

3. The motion assembly according to claim 1, wherein the forward and rearward guide pins cooperate with one and the same guide, and wherein the second inclined guide section is defined by a guide section branching off from the remainder of the guide, whereas provisions are made for letting the forward guide pin pass beyond said branching off second inclined guide section when the panels move from the coplanar position towards the stacked position, but diverting the rearward guide pin into said branching off second inclined guide section.

4. The motion assembly according to claim 3, wherein the guide comprises a diversion element for cooperation with the rearward guide pin, and wherein the rearward guide pin extends into said guide deep enough so as to cooperate with said diversion element, whereas the forward guide pin extends less deeply into the guide such as to pass beyond said diversion element without engaging it.

5. The motion assembly according to claim 4, wherein the diversion element is defined by an inclined wall section protruding into the guide and leading towards the second inclined guide section.

6. The motion assembly according to claim 1, wherein the connecting devices comprise a connecting pin on one panel movably engaging in a curve of an adjacent panel.

7. The motion assembly according to claim 6, wherein the connecting pin is located near to the rearward guide pin, whereas the curve extends substantially in parallel to said longitudinal side and, near to the forward guide pin, ends in an inclined curve section, the arrangement being such that in the coplanar position of the panels the connecting pin is located in the inclined curve section, whereas during the stacking operation the connecting pin moves towards and into the parallel section of the curve.

8. An open roof assembly for a vehicle, comprising a roof opening defined in a stationary roof part of the vehicle and a closure assembly configured for opening and closing said roof opening, wherein said closure assembly comprises a number of panels, and further comprising a motion assembly for moving the number of panels between a coplanar position in which the panels are positioned adjacent each other and extend in the same plane, and a stacked position in which the panels are positioned one on top of the other, wherein:
- each panel at each of its longitudinal sides is provided with a forward guide pin and a rearward guide pin which are guidingly housed in guides extending in parallel to said longitudinal sides;
- the guide for the forward guide pin ends in a first inclined guide section enclosing an angle with the remainder of said guide;
- the guide for the rearward guide pin ends in a second correspondingly inclined guide section enclosing an angle with the remainder of said guide;
- the distance between the first inclined guide section and the second inclined guide section substantially corresponds with the distance between the forward and rearward guide pins;
- the first inclined guide section comprises alternating inclined parts and parts extending in parallel to the guide, wherein the spacing between two successive parallel parts substantially corresponds with the spacing of the panels in the stacking direction; and
- connecting devices are configured for connecting each panel with an adjacent panel.

* * * * *